(12) United States Patent
Lee et al.

(10) Patent No.: US 12,744,704 B2
(45) Date of Patent: Sep. 22, 2026

(54) NETWORK ERROR REPORTING AND RECOVERY WITH IN-LINE PACKET PROCESSING PIPELINE

(71) Applicant: Intel Corporation, Santa Clara, CA (US)

(72) Inventors: Junggun Lee, Los Altos, CA (US); Anurag Agrawal, Santa Clara, CA (US); Yi Li, Fremont, CA (US); Jeremias Blendin, Santa Cruz, CA (US); Yanfang Le, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/130,383

(22) Filed: Apr. 3, 2023

(65) Prior Publication Data

US 2023/0239196 A1 Jul. 27, 2023

(51) Int. Cl.

| | |
|---|---|
| ***H04L 41/34*** | (2022.01) |
| ***H04L 41/0681*** | (2022.01) |
| ***H04L 47/11*** | (2022.01) |
| ***H04L 69/22*** | (2022.01) |

(52) U.S. Cl.

CPC ........ *H04L 41/0681* (2013.01); *H04L 47/115* (2013.01); *H04L 69/22* (2013.01)

(58) Field of Classification Search

None

See application file for complete search history.

(56) References Cited

U.S. PATENT DOCUMENTS

| | | |
|---|---|---|
| 8,687,629 B1 | 4/2014 | Kompella et al. |
| 8,713,220 B2 | 4/2014 | Agrawal et al. |
| 10,728,173 B1 | 7/2020 | Agrawal et al. |
| 10,785,342 B1 | 9/2020 | Bhide et al. |
| 10,848,429 B1 | 11/2020 | Lee et al. |
| 10,931,591 B2 | 2/2021 | Agrawal et al. |
| 11,716,291 B1 | 8/2023 | Agrawal et al. |
| 11,750,526 B2 | 9/2023 | Li et al. |
| 2019/0199602 A1 | 6/2019 | Zhang et al. |
| 2019/0286512 A1 | 9/2019 | Grealish et al. |
| 2020/0265002 A1 | 8/2020 | Agrawal et al. |
| 2020/0280518 A1 | 9/2020 | Lee et al. |

(Continued)

FOREIGN PATENT DOCUMENTS

| | | | |
|---|---|---|---|
| CN | 113259143 A | 8/2021 | |
| EP | 4156655 A1 * | 3/2023 | ........... H04L 61/256 |

OTHER PUBLICATIONS

Katta, Naga, et al., "Clove: Congestion-Aware Load Balancing at the Virtual Edge", CoNEXT '17, Dec. 12-15, 2017, Incheon, Republic of Korea, 13 pages.

(Continued)

*Primary Examiner* — Cai Y Chen

(74) *Attorney, Agent, or Firm* — Compass IP Law PC

(57) ABSTRACT

An apparatus is described. The apparatus includes electronic circuitry to support multiple flows within a network. The electronic circuitry to determine respective telemetry information for the multiple flows and inject an alarm message into a particular one of the multiple flows upon an alarm condition being reached for the particular one flow. The alarm message includes a multi-bit error code that describes the alarm condition. The multi-bit error code is one of multiple, possible multi-bit error codes.

20 Claims, 11 Drawing Sheets

(56) References Cited

U.S. PATENT DOCUMENTS

| | | | |
|---|---|---|---|
| 2020/0366618 | A1 | 11/2020 | Agrawal et al. |
| 2021/0266219 | A1 | 8/2021 | Kim et al. |
| 2021/0288945 | A1 | 9/2021 | Branscomb |
| 2021/0328930 | A1 | 10/2021 | Nikolaidis et al. |
| 2022/0109587 | A1 | 4/2022 | Sapio et al. |
| 2022/0109639 | A1 | 4/2022 | Agrawal et al. |
| 2022/0321400 | A1 | 10/2022 | Kodeboyina et al. |
| 2023/0038749 | A1 | 2/2023 | Bahadur et al. |
| 2023/0155988 | A1 | 5/2023 | Peri et al. |

OTHER PUBLICATIONS

The P4.ORG Applications Working Group, "In-band Network Telemetry (INT) Dataplane Specification", Version 2.1, Nov. 11, 2020, 56 pages.
Wikipedia Contributors, "Explicit Congestion Notification", Wikipedia, The Free Encyclopedia, https://en.wikipedia.org/w/index.php?title=Explicit_Congestion_Notification&oldid=1143671160 (accessed Apr. 2, 2023), 8 pages.
International Search Report and Written Opinion for PCT Patent Application No. PCT/US23/79354, Mailed Mar. 6, 2024, 14 pages.

* cited by examiner 302
313
303
M
M
M
M
S
S
S
S
N'wk Mgt Sys. 305
A+B+C flow stats
A+B flow stats
A flow stats
A
B
C
304
311
301
CPU
CPU
CPU
CPU
312
300

Fig. 3c

NETWORK ERROR REPORTING AND RECOVERY WITH IN-LINE PACKET PROCESSING PIPELINE

BACKGROUND OF THE INVENTION

As computing environments continue to rely on high speed, high bandwidth networks to interconnect their various computing components, system managers are increasingly concerned of a network's propensity to lose more information as its performance increases.

BRIEF DESCRIPTION OF THE DRAWINGS

FIGS. 3*a*, 3*b* and 3*c* pertain to error reporting and recovery mechanisms that can be performed with the improved networking switch of FIG. 2;

DETAILED DESCRIPTION

Figure 1A:
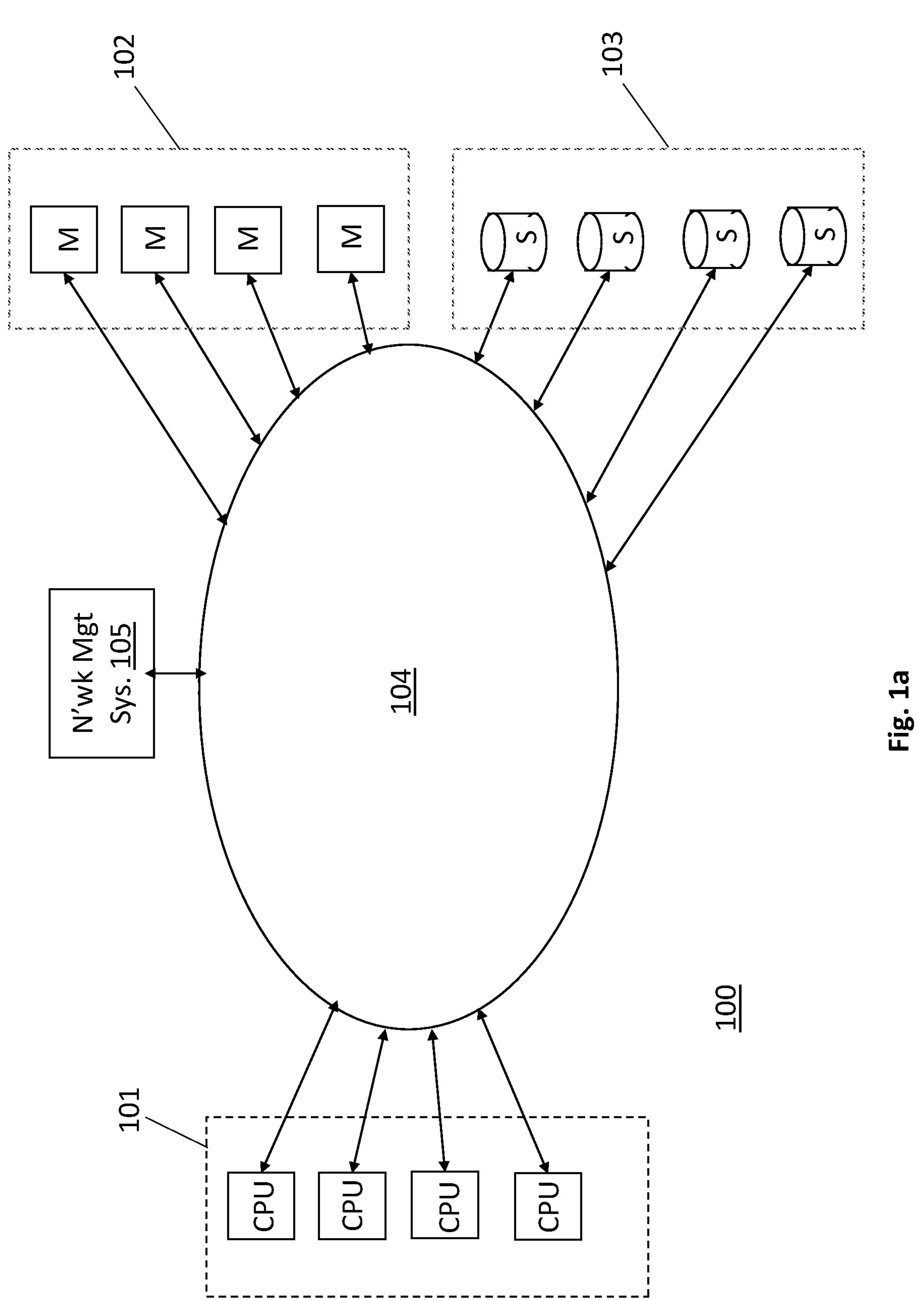
FIG. 1*a* shows a high performance computing environment.

FIG. 1*a* shows a high performance computing environment 100, such as a data center. As observed in FIG. 1*a*, the high performance computing environment 100 includes multiple units of high performance computing equipment (e.g., rack mounted CPU units 101, rack mounted memory units 102, rack mounted storage units 103) that are communicatively coupled with a network 104. The high performance computing equipment 101, 102, 103 sends packets of data and/or commands between one another through the network 104.

The overall performance of the computing environment 100 is improved as the end-to-end propagation delay of the packets through the network 104 lessens (the receiving end equipment receive their input packets sooner and therefore can operate on the packets' content sooner). A problem, however, is that as the speed of the network 104 increases, the propensity of the network 104 to corrupt packets or lose packets likewise increases.

Traditionally, lost packets have been handled through various per-flow resend mechanisms. Here, a flow is a unique logical "connection" though the network 104 between two endpoints (an endpoint can be unit of high performance equipment, or, a component within such equipment, such as a CPU core within a multicore CPU processor). Each flow is typically defined, at least partially, by a unique combination of source and destination addresses (other information, such as the applicable protocol, can also define a flow). During any instant of time, the network typically supports a large number of flows which reflects the number of different pairs of equipment endpoints that are in a communicative session with one other.

According to traditional flow protocols, a sending endpoint does not remove a packet from its local memory until the receiving endpoint has acknowledged its reception of the packet. If the sending endpoint does not receive an acknowledgement for a packet (or sequence of packets), the sending endpoint resends the packet(s) to the destination endpoint.

A problem is that as the frequency of lost or corrupted packets along a particular flow increases, the flow's overall throughput suffers. Here, the recovery time of a lost/corrupted packet is significant because the sending endpoint has to wait for a significant pre-determined amount of time (a timeout) without receipt of an acknowledgement before it resends a lost/corrupted packet.

Network nodes within the network can also monitor packet loss/corruption statistics and attempt to intervene (e.g., re-route a connection). However, as observed in FIG. 1*b*, the statistics collection and recovery intervention functions are typically implemented as centralized, slower software routines.

Figure 1B:
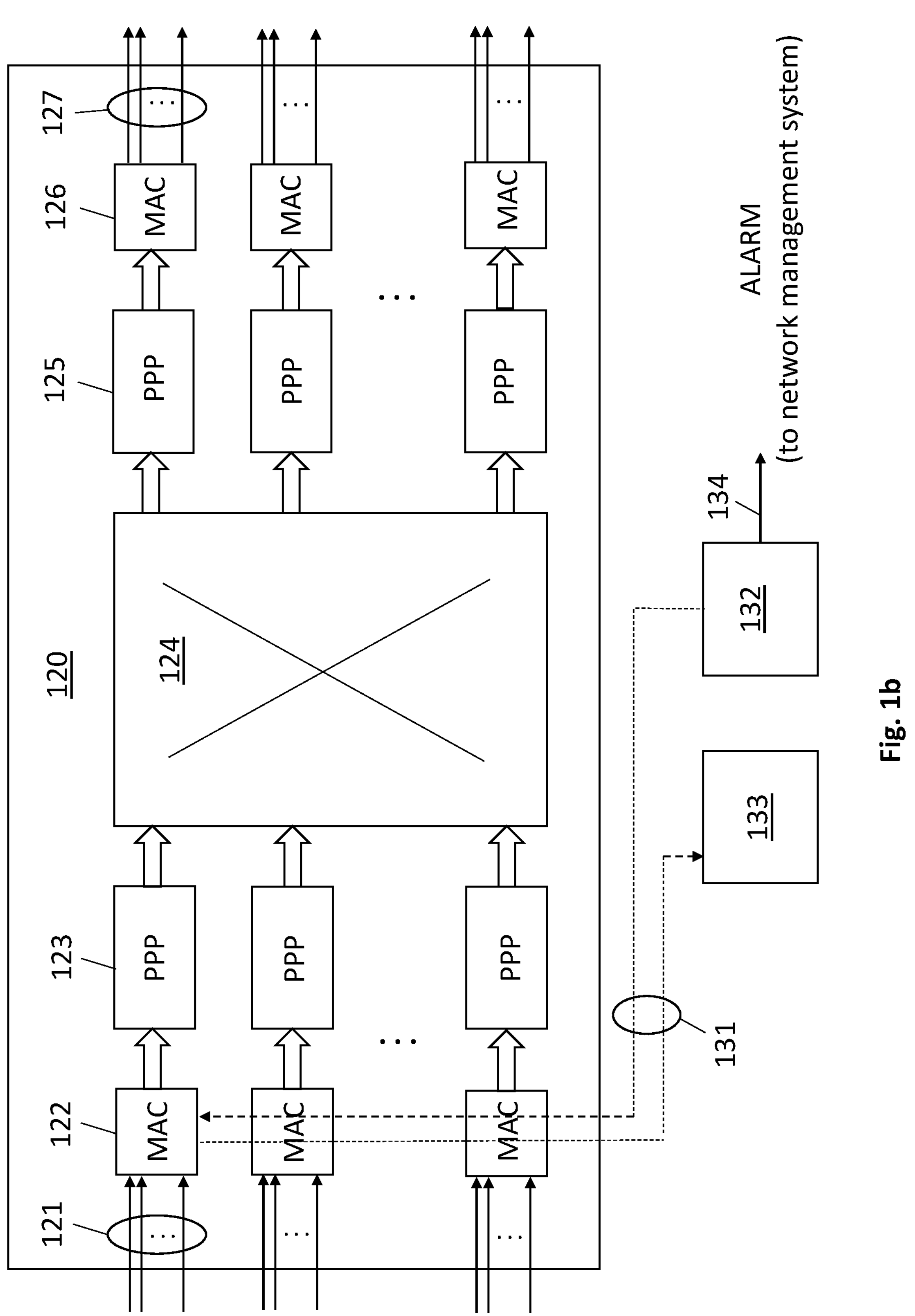
FIG. 1*b* shows a networking switch.

FIG. 1*b* shows a switch-on-a-chip architecture 120 that includes an ingress packet processing pipeline 123 between ingress media access control (MAC) layer circuitry 122 and a switch core 124. In the ingress direction, multiple ingress links 121 feed the ingress MAC circuitry 122, that in turn, feeds the ingress packet processing pipeline 123. The ingress MAC circuit 122 controls/oversees the inbound links 121 and pass received packets to the ingress pipelines 123.

The ingress packet processing pipeline 123 processes the ingress packets and forwards them to the switch core 124. Based, e.g., on the packets' respective destination address, the packets are routed to an appropriate egress path that includes an egress packet processing pipeline 225, MAC layer circuit 226 and corresponding egress links 227. The egress packet processing pipeline 125 constructs IP header fields for the outbound packets. The egress MAC circuitry 126 appends link layer header information to the packets and physically sends each of the packets over one of the egress links 127.

Although link statistics for the ingress and egress links 121, 127 are individually tracked at the media access control (MAC) layer 122, the statistics data is collected by polling 131 individual registers within the MAC layer circuitry 122 (for ease of illustration only ingress side polling 131 is depicted). Here, a general purpose processor core 132 executes polling software that individually accesses each statistics register for each link (e.g., in round-robin fashion) and then stores the collected data in memory 133. The reading of the statistics registers is essentially a slow, serial data collection process.

The data, after being stored in memory 133, is then analyzed by software running on the processing core 132 that causes the processing core 132 to execute hundreds or thousands of instructions (or more) to analyze the data.

If a problem is observed in one of the links (e.g., excessive errors along a particular link), the processing core 132 sends an alarm 134 to the network's central management system 105 (referring back to FIG. 1*a*). The central management system 105, in response, triggers the start of some kind of recovery algorithm (e.g., affected flows are re-routed so as to avoid a problematic link).

Here, the serial data collection and data analysis in software amount to the consumption of 10*s* or 100*s* of milliseconds after the MAC layer statistics reveal a problem before recovery from the problem is initiated. The consumption of 10*s* or 100*s* of milliseconds before the generation of an ALARM signal can result in many packets being dropped between the time the error information is first generated by the MAC circuitry 122 and the time any correction action is implemented.

Figure 2:
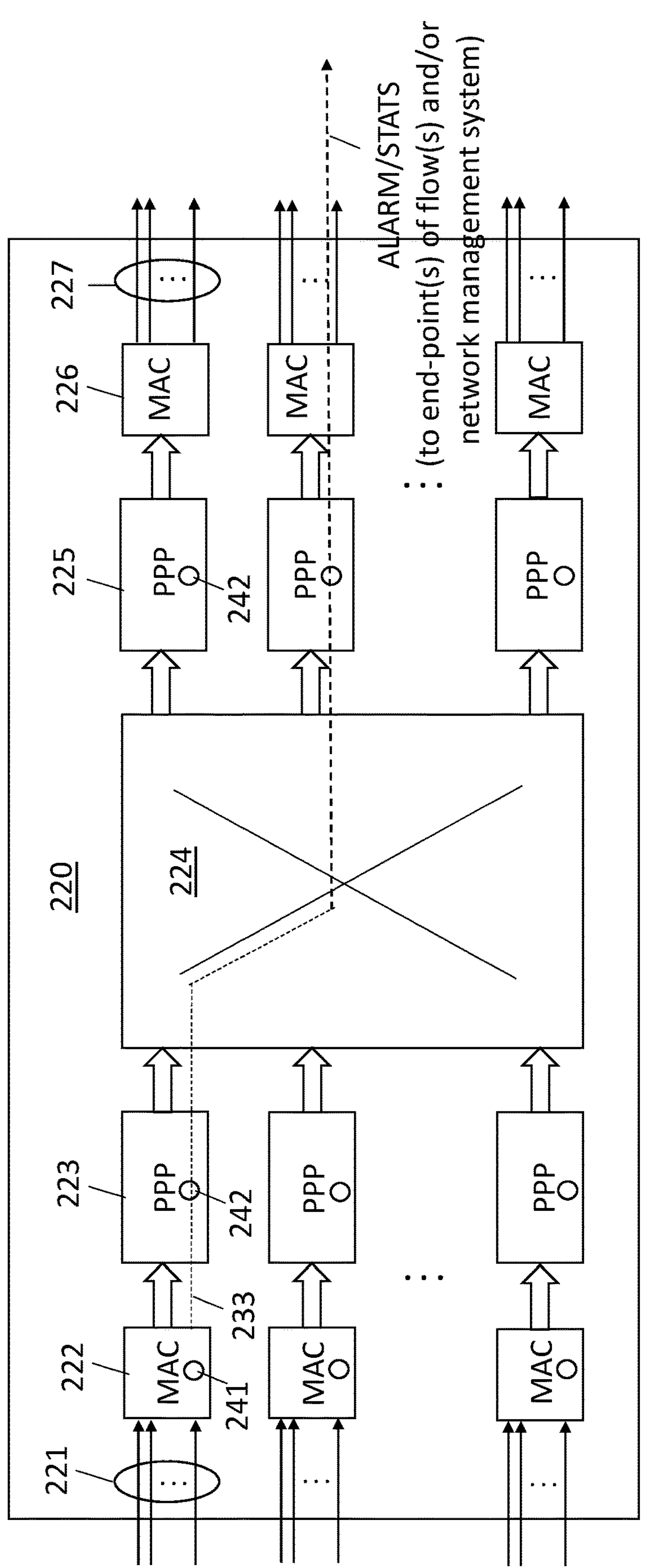
FIG. 2 shows an improved networking switch.

A solution, referring to FIG. 2, is to instead forward the link statistics information 233 from the MAC circuitry 222 to the ingress and/or egress packet processing pipelines 223, 226 and design the packet processing pipelines 223, 226 to construct packets that contain link telemetry information and/or contain an ALARM message derived from link telemetry information. Link telemetry information can be include link statistics ("link stats") information, information derived from link statistics information, or any combination of these. Notably, part of the packet construction process includes the insertion of destination address information within the packet header that specifies an endpoint (e.g., a destination endpoint) of one or more of the flows that are currently flowing through the system 220 and/or the network management system.

With the immediate construction of such packets and their reception shortly thereafter by one or more flow endpoints and/or the network management system, a recovery process can be initiated shortly after the MAC circuitry 222 generates the link stats information that warrants the recovery.

Here, with the packet processing pipelines 223, 236 being implemented, e.g., with dedicated hardwired logic circuitry that is integrated on the same semiconductor chip 220 as the MAC circuitry 222 that collects the link stats information, the pipelines 223, 236 can process the link stats information in hardware almost immediately after it is first generated by the MAC circuitry 222. As such, the time consuming serial polling of the link statistical information from the MAC circuitry 222 and the processing of the link statistical information in software can be avoided.

Figure 3A:
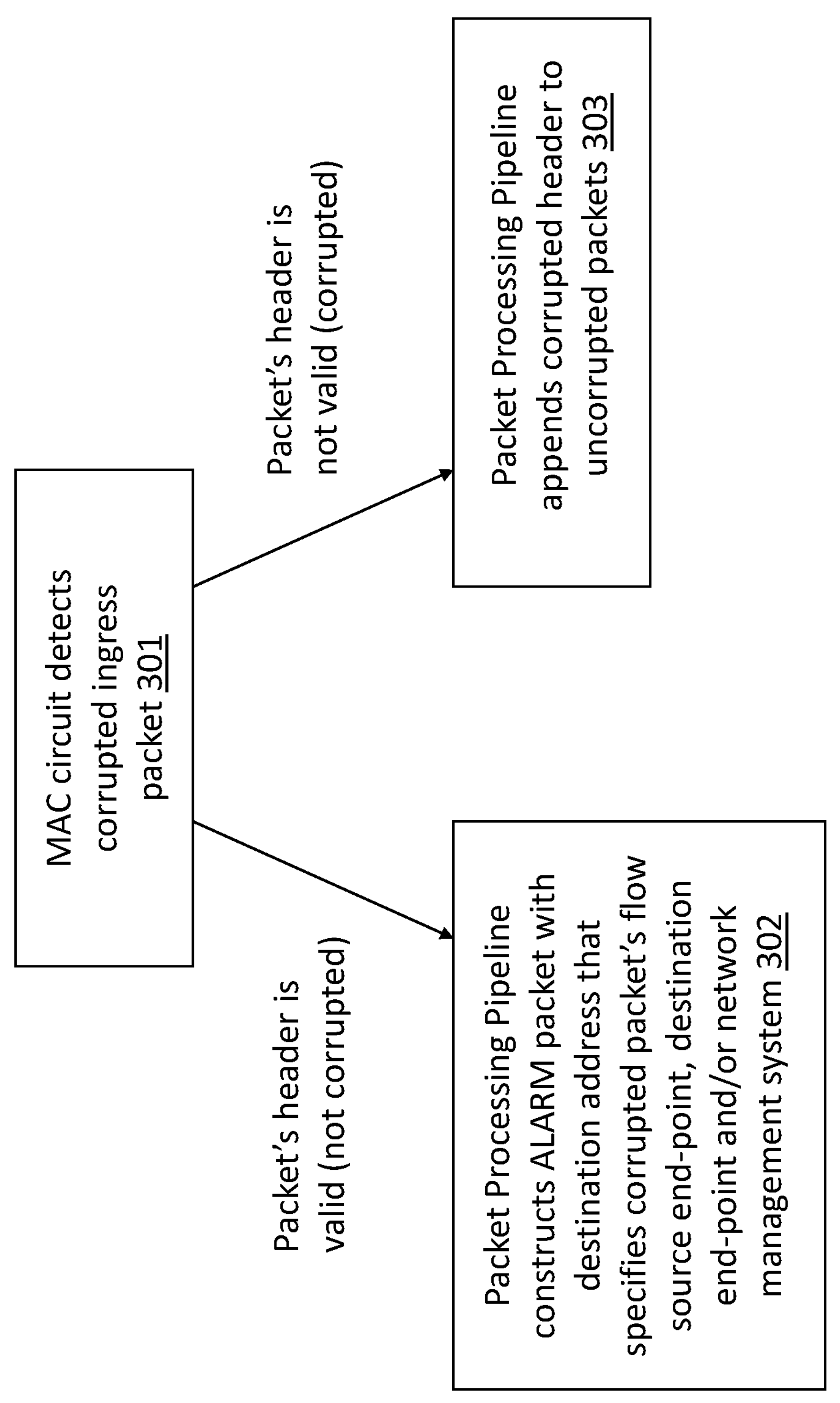
Figure 3B:
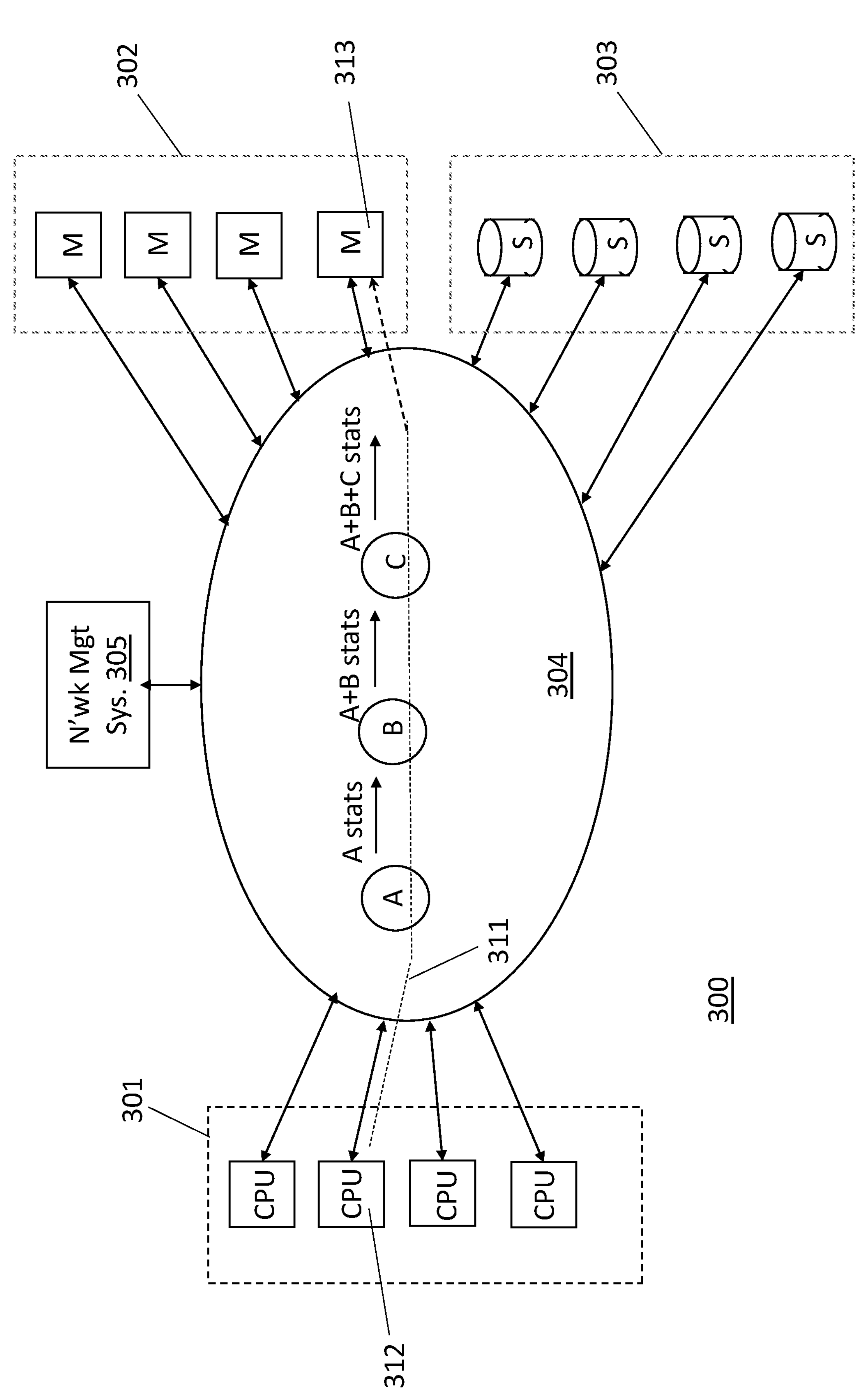
Figure 3C:
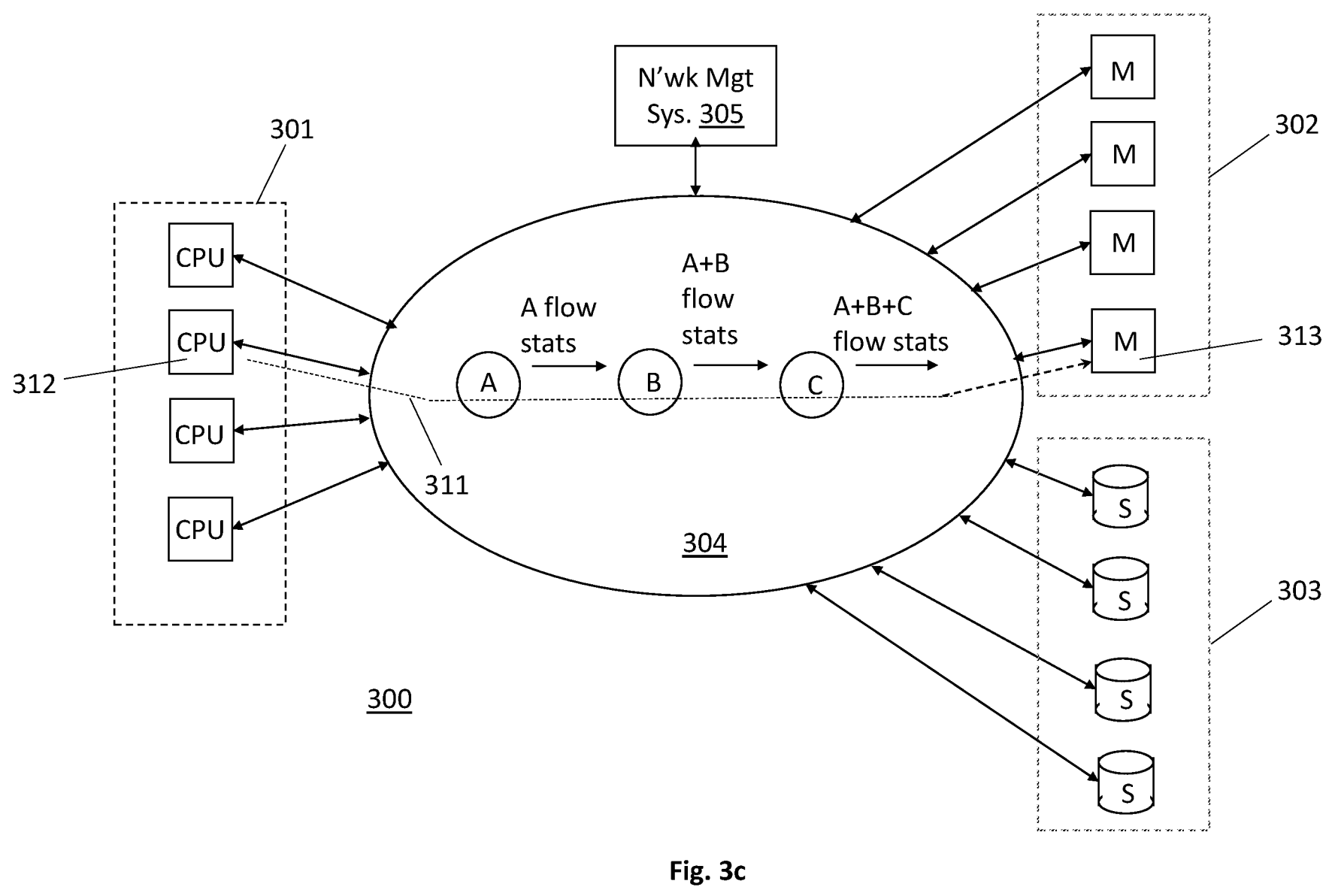

FIGS. 3*a*, 3*b* and 3*c* depict different approaches for the construction and sending of packets that contain link telemetry information and/or an ALARM message as described above.

FIG. 3*a* pertains to a first approach in which the ingress and/or egress packet processing pipelines 223, 226 generate a packet containing an ALARM message immediately upon receipt downstream from the ingress MAC circuitry 222 of header information from a packet that the ingress MAC circuitry 222 determined was corrupted. Here, for example, upon detection 301 of a corrupted ingress packet by an ingress MAC circuit 222, if the header information of the packet is valid (e.g., the corruption is within the packet payload), the MAC circuit 222 forwards the header and optionally a part of the packet's payload to the ingress packet processing pipeline 223 along with, e.g., a specific error code (amongst multiple possible error codes) that corresponds to the precise error that the MAC unit identified.

The packet processing pipeline 223 then uses the forwarded header and error code to construct 302 an ALARM packet that can be sent to the source endpoint of the packet's flow, the destination endpoint of the packet's flow or both to inform the endpoint(s) of the error. The endpoint(s) can then begin a recovery process (e.g., resend the packet (source endpoint)), request the packet be resent (destination endpoint sends request to source endpoint) and/or raise an alarm to the network management system. The original packet, being corrupted, is flushed/dropped 304 by the MAC circuit 222 or the packet processing pipeline.

Alternatively, meta data for the corrupted packet can be set (e.g., by the MAC circuit 222 or the ingress pipeline 223) to indicate that the packet is corrupted. A data structure that represents the packet is then switched through the switch 224 to the correct egress pipeline 225 (which, e.g., is associated with the destination endpoint if the ALARM message is to be sent there). The egress pipeline 225 observes from the meta data (which is logically attached to the data structure) that the packet is corrupted, generates the ALARM message and sends the ALARM message to, e.g., the destination endpoint for the corrupted packet's flow.

Notably, the ALARM message can include a multi-bit error code that specifies the particular problem, namely, that the packet's payload was determined to be corrupted. Here, the particular multi-bit error code is selected amongst multiple possible multi-bit error codes (e.g., multiple bits are needed to express multiple, different problems).

If the header information of the packet is not valid, the corrupted header is forwarded to the ingress packet processing pipeline 223 which stores it in local memory. The pipeline 223 then appends 303 the corrupted header as additional payload to any/all subsequent packets that are processed by the pipeline 223 that are not corrupted. Each such packet having the extra payload with the corrupted header can include an ALARM message having another multi-bit error code that specifies the particular problem, namely, that another packet that could belong to the same flow as the instant packet (that is carrying the extra payload) was deemed to have a corrupted header.

Such packets ideally reach their destination endpoint which process the multi bit error code and the corrupted header that was included as additional payload. Each receiving endpoint determines, from the content of the corrupted header, whether there is a high likelihood that the packet with the corrupted header was from its particular flow. If any receiving endpoint makes such a determination, the receiving endpoint can trigger a recovery with the sending endpoint (request resend of the packet), and/or send an ALARM to the network management system.

Apart from sending ALARM messages to the network management system from a destination endpoint of a flow whose packet was known to be corrupted or believed with high confidence to be corrupted, the ingress packet processing pipeline 223 that receives the invalid header information can also construct an ALARM message that includes the corrupted header information and multibit error code and send it directly to the network management system.

Further still, even if neither the MAC circuitry 222 nor the packet processing pipeline 223 can determine if the packet header is corrupt or not, the packet processing pipeline 223 can create and send an ALARM message with the packet's header information to either or both of the packet's source and destination endpoints so that these endpoints can determine if the packet header was corrupt or not (the ALARM message can be a separate packet from, or included within (e.g., appended to), the packet having the header with the indeterminate corruption status). The ALARM message can include another multibit error code that specifies the problem, namely, that the header's corruption status is unknown. The multibit error code (or data associated with the error code) can include information on the lack of knowledge as to where the possible corruption exists to make sure the packet can safely be dropped (e.g., in case the src/dst address itself is corrupt). Upon receiving the ALARM message, the source/destination endpoint(s) can match the packet header fields with their active connections. If there is no match, the packet header was corrupted. If there is a match, it is very likely that the packet header was not corrupted.

In the embodiments described above, note that the network address of a flow's destination and/or source endpoint need not (but can be) explicitly identified in any packet that carries an ALARM message. Here, consistent with label switching or other flow processes that change a packet's source and/or destination header information, the switching/routing function of a switch directs a packet to the correct egress port for the packet's flow.

In various embodiments, the network management system is at least partially distributed across the network's constituent switching nodes, including the packet processing pipeline's own switching node, in which case, the packet processing pipeline merely sends an internal communication to software that is locally executing on the switching node. Alternatively, the packet processing pipeline can incorporate a destination address into the header of an ALARM message packet that specifies an external network node for the network management system.

FIG. 3*b* pertains to an approach in which network telemetry information that is collected, e.g., at each nodal hop for a flow 311 through the network 304, is sent to the flow's destination endpoint 312. Here, as observed in FIG. 3*b*, a flow 311 flows through switches A, B and C from a source endpoint 312 to a destination end point 312.

Here, the ingress MAC circuitry 222 and/or ingress pipeline 223 for the ingress link of switch A that receives packets for flow 311 collects telemetry information for the link ("A stats"). The link telemetry information can include, to name just a few possibilities, any of: 1) a count of total errors since a global counter reset that, e.g., reset all link error counters in the network to 0; 2) a count of errors within a most recent time window (where time windows are shorted and continuously repeated); 3) #1) above with a timestamp; 4), #2) above with a timestamp; 5) #s 1) or 3) above with a link ID; 6) #s 2) or 4) above with a link ID, etc.

When a packet for the flow 311 is received from an ingress link at switch A, the telemetry information for the link is collected by the MAC circuitry 222 and/or the ingress packet processing pipeline 223 and then processed by either or both of switch A's packet processing pipelines 223, 225. Either or both of the packet processing pipeline(s) 223, 225 construct header information for the packet that includes the link's telemetry information (alternatively, the link's telemetry information can be appended to the packet as additional payload). The packet is then transmitted from the first switch A to the second switch B.

Similarly, telemetry information for the ingress link of switch B that the packet is received on is continuously collected by switch B's MAC circuitry 222 and/or the ingress packet processing pipeline 223 and then processed by either or both of switch B's packet processing pipelines 223, 225. When the packet is received by switch B and then processed by either or both of the pipelines 223, 225 within switch B, the pipeline(s) construct header information for the packet that accumulates or combines, in some way, the telemetry information for both the ingress link to switch A (which were carried by the packet from switch A to switch B) and the ingress link to switch B. The accumulated error stats are depicted as "A+B stats" in FIG. 3*b*.

In a basic approach, the link telemetry information counts total errors at each link and the accumulation adds the two counts from both links to produce a single total error count (a scalar). In another approach, the accumulation lists the respective error counts for the two links as two different numbers (a vector). In either of these approaches the error counts can be a total error count (e.g., since a global reset) or an error count within a most recent time window that is reset to zero after each expiration of the time window. For any of these approaches a timestamp and/or the IDs of the links can also be included with the error stats for a particular link whose telemetry is incorporated into the packet.

Regardless, after the accumulated telemetry information (A+B stats) has been integrated into the packet, the packet is transmitted from the second switch B to the third switch C along the flow 311.

The process then repeats for the third switch C resulting in the accumulated telemetry information for the three respective ingress links into switches A, B, C ("A+B+C stats") being incorporated into the packet before it is sent from the third switch C to the receiving endpoint 313.

The destination endpoint 313 can then process the telemetry information to decide whether or not a problem exists along the packet's flow 311 and raise an error flag if so. For example, if the telemetry information is presented as a scalar (errors across all three links are added), the endpoint 313 can use a predetermined threshold to determine whether or not a problem exists (e.g., if the scalar count exceeds the threshold, a problem exists). As another example, if the telemetry information is presented as a vector (errors from all three links are provided separately), the endpoint 313 can use a predetermined, lower threshold for each link to determine whether or not a problem exists (if any particular link's error count exceeds the lower threshold, a problem is flagged).

If timestamps are provided with the counts for either of the above approaches, the endpoint 313 can additionally consider, e.g., if the link errors correlate to any of the flow's currently missing packets. For example, if the receiving endpoint 313 is tracking the steady inflow of telemetry information and detects a sudden jump in link errors within in a same time window in which expected packets have failed to arrive, the receiving endpoint 313 can assume that's its packets are amongst those included in the jump in errors. In this case, the endpoint 313 can decide there is a problem's with the flow 311 and, e.g., raise a flag which causes the endpoint 313 to request the sending endpoint 312 to resend them or send an ALARM message to the network management system 305.

For any of these approaches, if link IDs are provided with a link's telemetry, the endpoint 313 can not only determine there is an error in its flow but can also name the links in the flow and/or the particular link in the flow that is the likely source of the problem. The endpoint can send this information, e.g., within an ALARM message that is sent to the network management system 305. Such information can streamline the network management system's recovery process (e.g., by reconfiguring switching tables to avoid use of a bad link).

Note that the destination endpoint 313 can collect telemetry and process it to make decisions/determinations and raise flags in response thereto, or, merely collect telemetry and send it to the source endpoint 312 which processes it to make decisions/determinations and raise flags in response thereto. Operating points between these two extremes are also possible where both endpoints 312, 313 perform some processing of telemetry data and/or decision making against it.

In cases where the destination endpoint 313 sends telemetry information back to the source endpoint 312, the source endpoint can use the telemetry information, e.g., to adjust one or more of the flow's transmission parameters (e.g., packet transmission rate, packet size, etc.).

Other possible collected telemetry approaches and their follow-on processes are provided in 1) thru 3) immediately below.

1) In the case where telemetry information includes timestamps for each nodal hop experienced by one or more packets that belong to the flow, the destination endpoint 313 that receives the timestamp telemetry can construct a recording of the end-to-end propagation delay through the network (single packet) or average end-to-end propagation delay (multiple packets). The source 312 and/or destination endpoints 313 can use this information, together with link quality telemetry and/or packet loss/corruption indicators (e.g., as per the above described ALARM messages of FIG. 3*a*) to raise a flag that causes the flow's endpoint protocols to tighten their packet loss detection timers (e.g., reduce the packet loss detection timeout window). These timeouts are usually set very conservatively (are elongated in time) to prevent false positives. In the case of poor link telemetry and/or an increased rate of flow related ALARM messages (such as those described above with respect to FIG. 3*a*), the propagation delay telemetry information can be used to establish a more informed timeout window (e.g., some modest expanse in time beyond the flow's core distribution of experience propagation delays) so that true errors are captured sooner than with a lengthy timeout window. Even without indicia of poor link quality from the telemetry, the propagation delay information can be used for guidance on setting the timeout window.

2) A source and/or destination endpoint 312, 313 can decide, upon learning that packet loss is more likely along the path of a specific flow and/or along a particular link, combined with the absence of any telemetry information that suggests congestion within the network, that the link is suffering from, e.g., noise or other deeper problems unrelated to the link's load (the link is bad). In this case, the endpoint can raise a flag that causes the flow to be re-routed so that it avoids the link rather than raise a flag that, e.g., causes the sending rate to be reduced or causes a congestion window to be reduced. This is an improvement over protocols that assume that packet loss is caused by too high a sending rate and/or congestion. Instead, the endpoint raises a flag that indicates the "packet loss is caused by bad link quality", which does not try to adapt the sending rate or decease the congestion window for the affected flows.

3) If a source and/or destination endpoint 312, 313 learns about bad link quality along a flow used to send very small messages (e.g., a message composed of only one or two packets), or the last packet of a message along the flow, the information can be used to cause the source endpoint 312 to send the packet twice. Here, if a message is composed, e.g., of only one packet, the loss of this packet will not be noticed until the packet loss timer expires (because there are no follow-up packets in the flow that could transport information about the lost packet). This can consume a length amount of time and incur a heavy reduction in performance. If packet loss is more likely, sending the message more than once (e.g., twice) will increase the likelihood that at least one of them will arrive at the destination thereby avoiding the timeout penalty. At the same time, particularly if the packet is small, the bandwidth overhead of the multiple sending is not significant. Multiple sending can also be used for very important messages that, e.g., are time sensitive, or otherwise sensitive to the loss of any particular packet in the message's sequenced stream of packets.

Notably, the above described approaches of FIGS. 3*a* and 3*b* describe fast comprehension by a flow's endpoints 312, 313 of the performance of the networking equipment within the network 304 that supports the flow 311. Here, the end-to-end propagation delay along the flow 311 through the network 304 can be less than 10 microseconds. As such, even though a problem is not discovered, e.g., until a packet reaches its destination 313, the problem can nevertheless be discovered, diagnosed (e.g., with data that isolates where the problem is within the network 304) and a flag raised to cause corrective action well before a traditional polling and analysis processor solution would have discovered and reported the problem.

Whereas the approach of FIG. 3*a* is directed to immediately reporting a problem via an ALARM message and multi-bit error code with a particular packet from the switch where the packet was first dropped, by contrast, the process of FIG. 3*b* accumulates link telemetry across a flow at the flow's destination endpoint 313. Notably, a single link potentially supports a large number of different flows at any moment of time. Thus, with respect to link telemetry specifically, the destination endpoint 313 is observing telemetry that affects/describes all flows that flow through the links that the flow 311 shares with other flows. Thus, conceivably, if a link suffers a performance problem, the telemetry information received by multiple endpoints (of the flows that flow through the link) can reflect the problematic link. Multiple flags concurrently raised by the multiple endpoints can further highlight the problem to network management.

The discussion of FIG. 3*b* just above emphasized a "feed forward" approach in which telemetry information is collected at the ingress side and accumulated in a forward direction toward the receiving endpoint 313. In other embodiments, link telemetry information can be collected at the egress side MAC layer 227 (e.g., and passed to the egress side packet processing pipeline 225) for inclusion into egress packets (and accumulated with the link telemetry of earlier links that an egress packet has traversed). The accumulated information can then be received at the receiving endpoint 313 as discussed above.

In still further approaches, whether telemetry information is collected at the ingress side and/or egress side of switch, the telemetry information can instead or in combination be appended to packets that are being sent from destination endpoint 313 to source endpoint 312 (reverse flow direction). Sending telemetry to the source endpoint 312 of a flow allows the source endpoint 312 to immediately raise a flag and take responsive corrective active where source activity could alleviate the problem that the flag was raised for. For example, the source can begin resending packets for any packets that were sent shortly after a jump in errors along the flow were detected.

In yet another approach, referring to FIG. 3*c*, per flow telemetry is effected. Here, telemetry information for a single flow are appended to packets belonging to that flow. A problem in the flow can be detected in one of the flow's nodal hops (switches) or at one or both of the flow's endpoints.

Here, when the MAC layer of any of switches A, B, C determines it has received a corrupted packet, it not only forwards to a packet processing pipeline within the switch the existence of the error (and possibly additional information such as an error code that specifies the type of error), but also forwards the source and destination address information of the packet as well as other header information to the pipeline (if the source and destination address information is believed to be valid).

In this case the packet processing pipeline can use this information to build a table that bins error stats according to source and destination address information and/or other header information used to define a flow. Thus, telemetry information is collected on a per flow basis. The per flow telemetry information is then included in the packets that belong to the flow (e.g., within the header or as additional payload). The telemetry can be any of those described above with respect to FIGS. 3*a* and 3*b*, except that they are dedicated to a particular flow rather than reflecting the cumulation of all flows along a particular link.

Here, problems in a particular flow can be detected by a merging of the mechanisms described above with respect to FIG. 3*a* and FIG. 3*b*. For example, thresholds for errors or error rates can be pre-determined and programmed into the switches A, B, C. If any of the switches A, B, C detect that an internal error count/rate for a flow exceeded its threshold, the switch can send an ALARM message to either or both of the flow's endpoints 312, 313 and/or network management system 305. The ALARM message includes a multi-bit error code that, e.g., indicates that a threshold was exceeded for a particular error count/rate. The circuitry that collects the per flow telemetry and compares it against its applicable one or more thresholds and the circuitry that constructs the ALARM message can be integrated into MAC layer circuitry and/or either or both of ingress and egress packet processing pipelines. The ALARM message can also be sent to the network management system.

Referring back to FIG. 2, FIG. 2 shows different areas of circuitry that enable any/all of the packet processing pipeline supported ALARM message generation and telemetry collecting and reporting mechanisms described just above with respect to FIGS. 3*a*, 3*b* and 3*c*. Here, the MAC layer circuitry 222 includes circuitry 241 to pass any of the following information to a packet processing pipeline 223, 225: 1) the header of a corrupted packet (including information that indicates whether the header is valid or invalid); 2) link telemetry information (e.g., link rate, packets/sec, link error count, link error rate, etc.). As described further below, per flow telemetry information can be collected by a packet processing pipeline in view of each packet's header information (which contains information that defines the packet's flow) and any corruptions identified by the MAC layer circuitry and/or pipeline for that flow's packets.

The information can be forwarded directly from ingress side MAC layer circuitry 222 to an ingress side pipeline 223. According to a first approach, the information is forwarded to the pipeline 223 as a discrete data item. According to a second approach, the information is "piggy backed" with valid packets that are passed from the MAC layer 222 to the pipeline 223. According to a third approach, the MAC layer 222 constructs a special packet with the information (e.g., in its payload) and forwards the specially constructed packet to the ingress pipeline 223.

In order to pass the information from the ingress side MAC layer 222 to an egress side pipeline 225, the ingress side MAC layer 222 or ingress side pipeline 223 can specially construct a packet that identifies, by way of a destination address, where any ALARM message or telemetry report-out generated from the information is to be sent. Alternatively, the information can be appended to a valid packet having the destination address. The packet is then switched through the switch core 204 and directed to the appropriate egress packet processing pipelines 225. The information is then processed by the egress side pipeline 225 and generates any ALARM messages and/or telemetry report-outs as is appropriate.

In the case of 1) above (header of a corrupted packet is forwarded to pipeline), circuitry 241 with the MAC layer 222 is designed to forward the header of a packet to a packet processing pipeline 223, 225 if the MAC layer 222 determines the packet is corrupted (the circuitry 241 can also include information that indicates whether the header is valid or not). Thus, circuitry 241 will pass the header of a packet to a packet processing pipeline 223, 225 even if error checking circuitry within the MAC circuitry 222 determines, e.g., that a packet's payload is corrupted after processing parity, cyclic redundancy check (CRC), error correction coding (ECC), forward error correction (FEC), or other error checking information that was included with the packet.

The packet processing pipeline 223, 225 includes circuitry 242 to, as described above with respect to FIG. 3*a*, use the valid packet header information of a corrupted packet to construct an ALARM message packet with multi-bit error code that includes the valid packet header in its payload and a destination address in its header that is sufficient to send the ALARM message packet to the sending endpoint of the corrupted packet's flow, the receiving endpoint of the corrupted packet's flow, and/or the network management system.

In the packet header is not valid, circuitry 242 within the ingress packet processing pipeline 223 will append the corrupted packet header to, e.g., at least one valid packet for each flow that the ingress pipeline 223 is processing so that the corrupted packet header will be received at the source or destination end point of each flow that the pipeline 223 is currently processing.

Here, the ingress packet processing pipeline 223 includes a stage that performs packet classification. To perform packet classification the stage maintains a table (e.g., in memory that is coupled to the stage) that, e.g., has a separate entry for each flow that is currently supported by the pipeline 223.

Here, pipeline circuitry 242 can maintain information for each entry that indicates whether the pipeline has appended a particular invalid header to a packet that belongs to that entry's flow. Upon each new packet processed by the pipeline 223, the pipeline 223 looks up the information in the entry for the packet's flow. If the entry indicates the invalid header has been appended to a previous packet that belongs to the flow, the pipeline 223 does not append the invalid header to the packet. If the entry indicates the invalid header has not been appended to any previous packet that belongs to the flow, the pipeline 223 appends the invalid header to the packet and updates the entry to indicate that the invalid header has been appended to a packet that belongs to the flow.

With respect to the sending of link telemetry, MAC layer circuitry 241 can report any/all of the link and/or per flow error information described above with respect to FIGS. 3*b* and 3*c* to the ingress pipeline 223. This includes link rate, packets/sec, link error count, link error rate, total link errors after a reset, total link errors within a time window and per flow errors (where the source/destination address information of a corrupt packet (if valid) is passed to the pipeline), etc.

The circuitry 242 of ingress packet processing pipeline 223 can also inject telemetry information into the header information of the packets it processes and/or create new packets that contain the telemetry information and the appropriate header information (such as correct source/destination address). Here, circuitry 242 is coupled to memory that keeps telemetry information. When telemetry information is passed to the pipeline 223 from the MAC layer 222 circuitry 242 writes the telemetry information into the memory. When the pipeline 223 is processing a packet, circuitry 242 reads the telemetry information from the table and incorporates/injects the telemetry information into the packet. Alternatively or in combination, circuitry 242 can create new packets that contain the telemetry information and inject it into the flows that the pipeline 223 supports. The injections can be, e.g., periodic, event based, etc. In the case of link telemetry (as opposed to per flow telemetry), the MAC layer can instead include circuitry that is coupled to a memory that keeps link telemetry information and performs any/all of these functions.

In the case of per flow telemetry, the telemetry information in the memory is viewed as a table that has a different entry for each flow supported by the pipeline 223. In this case, pipeline circuitry 242 writes telemetry for a particular flow (e.g., packet error counts/rates for various types of errors observed in the flow's packets, etc.) into the flow's corresponding entry in the table and injects such telemetry only into packets that belong to the flow. Alternatively or in combination, pipeline circuitry 242 can create new packets for a particular flow that contain the flow's telemetry information and inject it into the particular flow. The injections can be, e.g., periodic, event based, etc.

Figure 4:
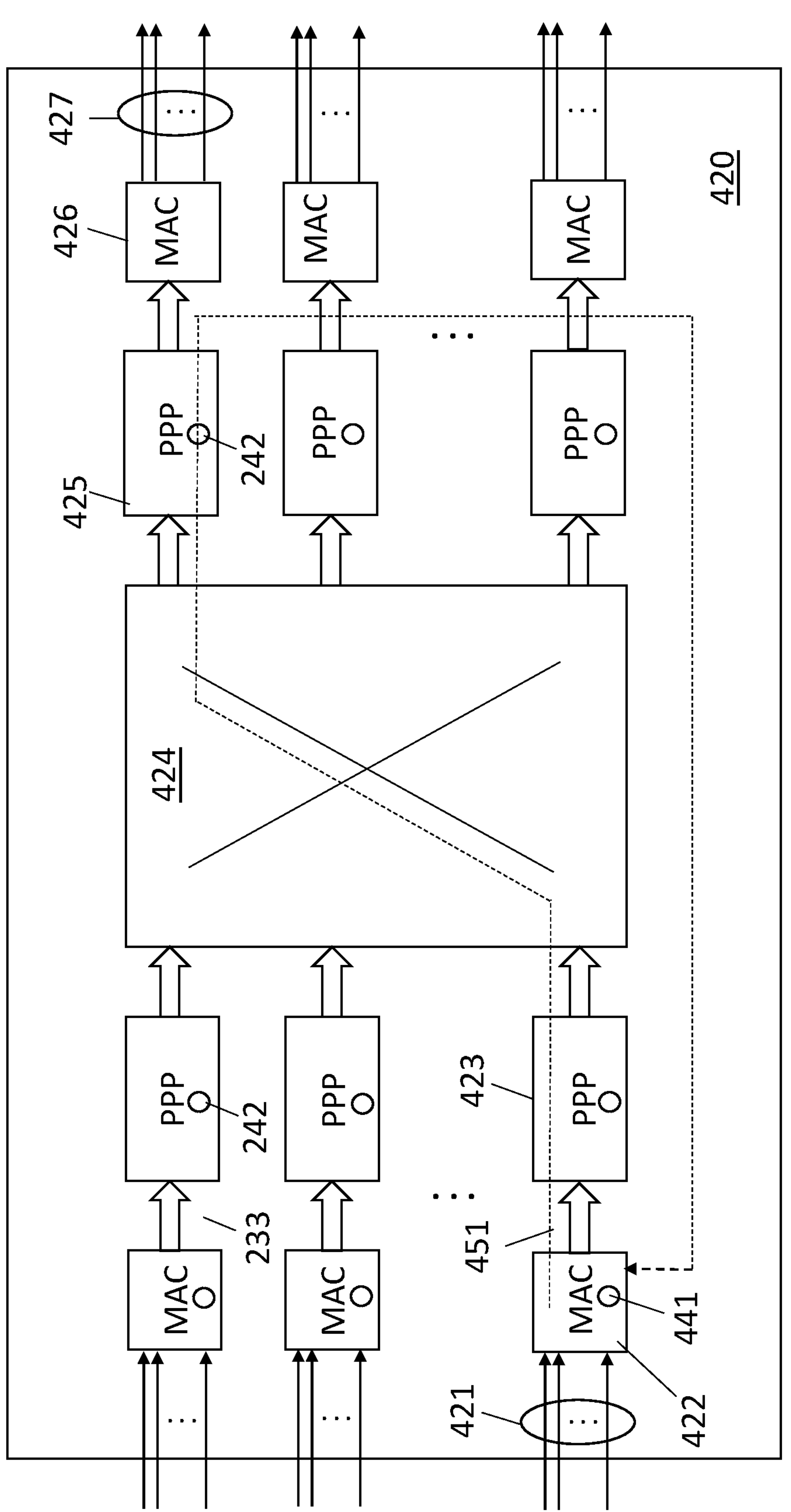
FIG. 4 pertains to another error reporting and recovery mechanism that can be performed with the improved networking switch of FIG. 2.

FIG. 4 shows another feature of reporting errors and/or telemetry through the packet processing pipelines of a networking hardware switch 420. Specifically, corrupted packets as explained in the above teachings have been assumed to be corrupted before being received by the switch's ingress MAC layer. It also possible that the switch 420 itself can corrupt a packet.

Here, FIG. 4 shows an exemplary path 451 of packet that is received uncorrupted along one of ingress links 421 and processed by the following MAC layer circuitry 422 and ingress packet processing pipeline 423 without problem (the packet remains uncorrupted). The packet is then passed through a queue (not shown) and is switched through the switch core 424. During the packet's travels through the queue and switch core 424, the packet's payload becomes corrupted. The egress packet processing pipeline 425 that processes the packet in the outbound direction discovers the corruption (e.g., by processing error code information associated with the payload).

Here, instead of allowing the packet to be transmitted along an egress link, the packet processing pipeline 425 instead reroutes the packet back to the ingress MAC layer circuitry 422 that originally processed it after its reception. The MAC layer circuitry then proceeds to process the packet as if it had been received as a corrupted packet according to any of the processes described above in which error information is passed to one of the packet processing pipelines 423, 425. Notably, however, the error information is tracked/recorded as being associated with an internal corruption of the switch 420 rather than a link. As such, an additional dimension of the error stats can specify whether the error is a link error or an internal switch error.

Note that although the teachings above have been directed to a networking switch 220 having a switching core 224, in various embodiments the switching core 224 is implemented with a routing core that transitions ingress traffic to egress traffic through the execution of software executing on one or more processors rather than dedicated hardware circuitry.

The various embodiments described above embrace implementations where the packet processing pipeline incorporates the error information received from the MAC layer circuitry (e.g., as is) into an ALARM message for or other packet that is used for error recovery, as well as implementations where the packet processing pipeline processes the error information in some way. For example, with respect to the later, the packet processing pipeline accumulates prior error stats with its local error stats (see, e.g., FIG. 3*b* and its discussion), and/or, the packet processing pipeline determines per flow error stats (see, e.g., FIG. 3*c* and its discussion).

Thus, apart from copying "first" error information as received from the MAC layer into a packet that is used for error recovery (e.g., an ALARM message packet), the packet processing pipeline can also (or in the alternative) calculate/determine "second" error information from such "first" error information and incorporate the second error information into a packet that is used for error recovery.

Any/all of the flow source and flow destination endpoint processes described above can be respectively implemented with flow source endpoint processing circuitry and flow destination endpoint circuitry. Such circuitry can be implemented with dedicated hardwired (e.g., ASIC) circuitry, programmable circuitry (e.g., FPGA), circuitry that executes program code (e.g., a processor) or any combination of these.

Various aspects of the teachings above may be implemented to conform with various industry standards or specifications such as the "In-band Network Telemetry (INT) Dataplane Specification", by the P4.org Applications Working Group, v2.1, Nov. 11, 2020, or later version.

With respect to the computing environment of FIG. 1*a*, a new computing environment (e.g., data center) paradigm is emerging in which "infrastructure" tasks are offloaded from traditional general purpose "host" CPUs (where application software programs are executed) to an infrastructure processing unit (IPU), data processing unit (DPU) or smart networking interface card (SmartNIC), any/all of which are hereafter referred to as an IPU.

Networked based computer services, such as those provided by cloud services and/or large enterprise data centers, commonly execute application software programs for remote clients. Here, the application software programs typically execute a specific (e.g., "business") end-function (e.g., customer servicing, purchasing, supply-chain management, email, etc.). Remote clients invoke/use these applications through temporary network sessions/connections that are established by the data center between the clients and the applications.

In order to support the network sessions and/or the applications' functionality, however, certain underlying computationally intensive and/or trafficking intensive functions ("infrastructure" functions) are performed.

Examples of infrastructure functions include encryption/decryption for secure network connections, compression/decompression for smaller footprint data storage and/or network communications, virtual networking between clients and applications and/or between applications, packet processing, ingress/egress queuing of the networking traffic between clients and applications and/or between applications, ingress/egress queueing of the command/response traffic between the applications and mass storage devices, error checking (including checksum calculations to ensure data integrity), distributed computing remote memory access functions, etc.

Traditionally, these infrastructure functions have been performed by the CPU units "beneath" their end-function applications. However, the intensity of the infrastructure functions has begun to affect the ability of the CPUs to perform their end-function applications in a timely manner relative to the expectations of the clients, and/or, perform their end-functions in a power efficient manner relative to the expectations of data center operators. Moreover, the CPUs, which are typically complex instruction set (CISC) processors, are better utilized executing the processes of a wide variety of different application software programs than the more mundane and/or more focused infrastructure processes.

Figure 5:
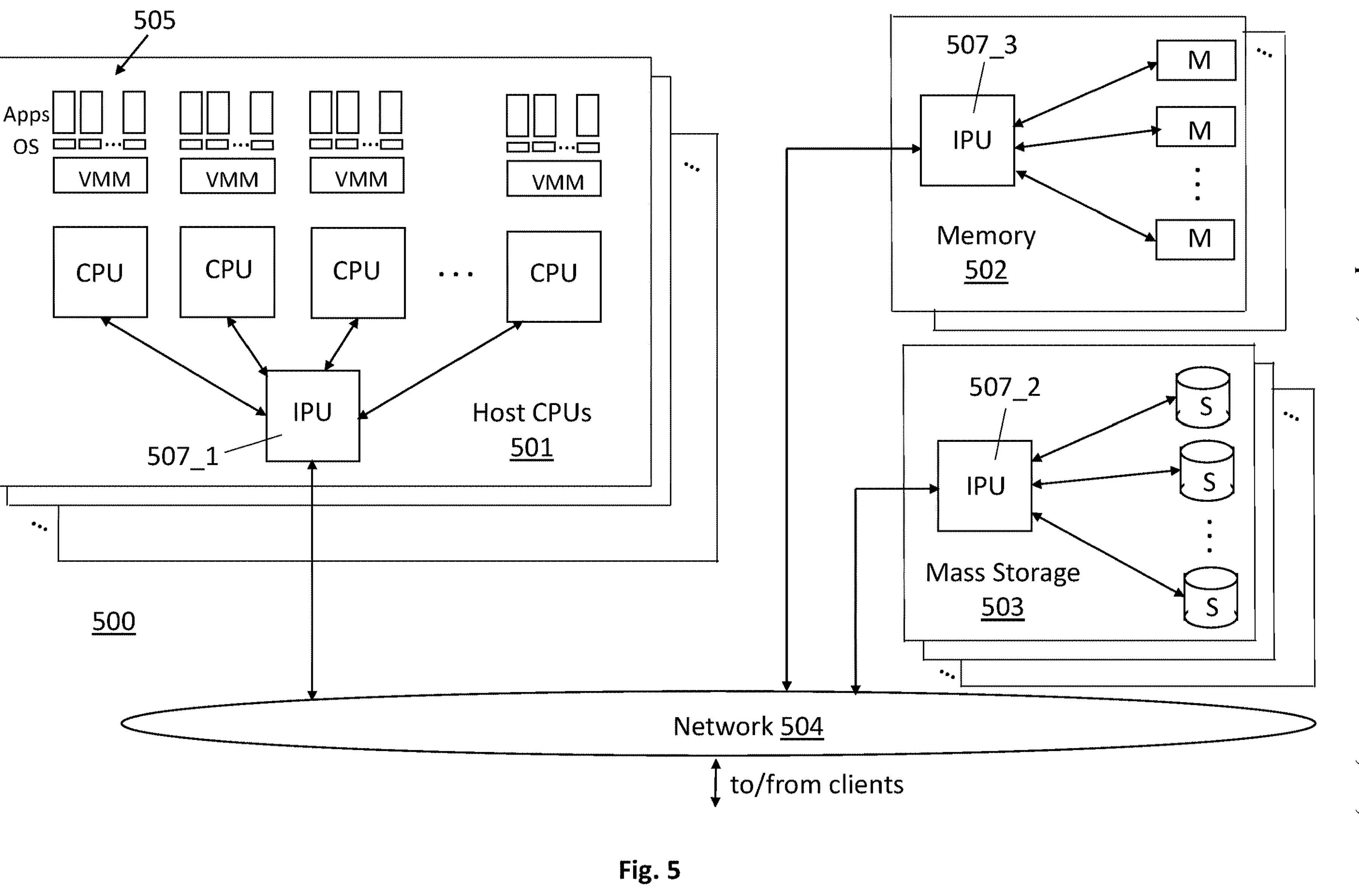
FIG. 5 depicts another high performance computing system.

As such, as observed in FIG. 5, the infrastructure functions are being migrated to an infrastructure processing unit. FIG. 5 depicts an exemplary data center environment 500 that integrates IPUs 507 to offload infrastructure functions from the host CPUs 504 as described above.

As observed in FIG. 5, the exemplary data center environment 500 includes pools 501 of CPU units that execute the end-function application software programs 505 that are typically invoked by remotely calling clients. The data center also includes separate memory pools 502 and mass storage pools 405 to assist the executing applications.

The CPU, memory storage and mass storage pools 501, 502, 503 are respectively coupled by one or more networks 504. The network(s) can include switches and/or routers that use packet processing pipelines to track, report and recover from network errors as described at length above with respect to FIGS. 2, 3*a*, 3*b*, 3*c* and 4.

Notably, each pool 501, 502, 503 has an IPU 507_1, 507_2, 507_3 on its front end or network side. Here, each IPU 507 performs pre-configured infrastructure functions on the inbound (request) packets it receives from the network 504 before delivering the requests to its respective pool's end function (e.g., executing software in the case of the CPU pool 501, memory in the case of memory pool 502 and storage in the case of mass storage pool 503). As the end functions send certain communications into the network 504, the IPU 507 performs pre-configured infrastructure functions on the outbound communications before transmitting them into the network 504.

Depending on implementation, one or more CPU pools 501, memory pools 502, and mass storage pools 503 and network 504 can exist within a single chassis, e.g., as a traditional rack mounted computing system (e.g., server computer). In a disaggregated computing system implementation, one or more CPU pools 501, memory pools 502, and mass storage pools 503 are separate rack mountable units (e.g., rack mountable CPU units, rack mountable memory units (M), rack mountable mass storage units(S)).

In various embodiments, the software platform on which the applications 505 are executed include a virtual machine monitor (VMM), or hypervisor, that instantiates multiple virtual machines (VMs). Operating system (OS) instances respectively execute on the VMs and the applications execute on the OS instances. Alternatively or combined, container engines (e.g., Kubernetes container engines) respectively execute on the OS instances. The container engines provide virtualized OS instances and containers respectively execute on the virtualized OS instances. The containers provide isolated execution environment for a suite of applications which can include, applications for micro-services. The same software platform can execute on the CPU units 201 of FIG. 2.

Figure 6A:
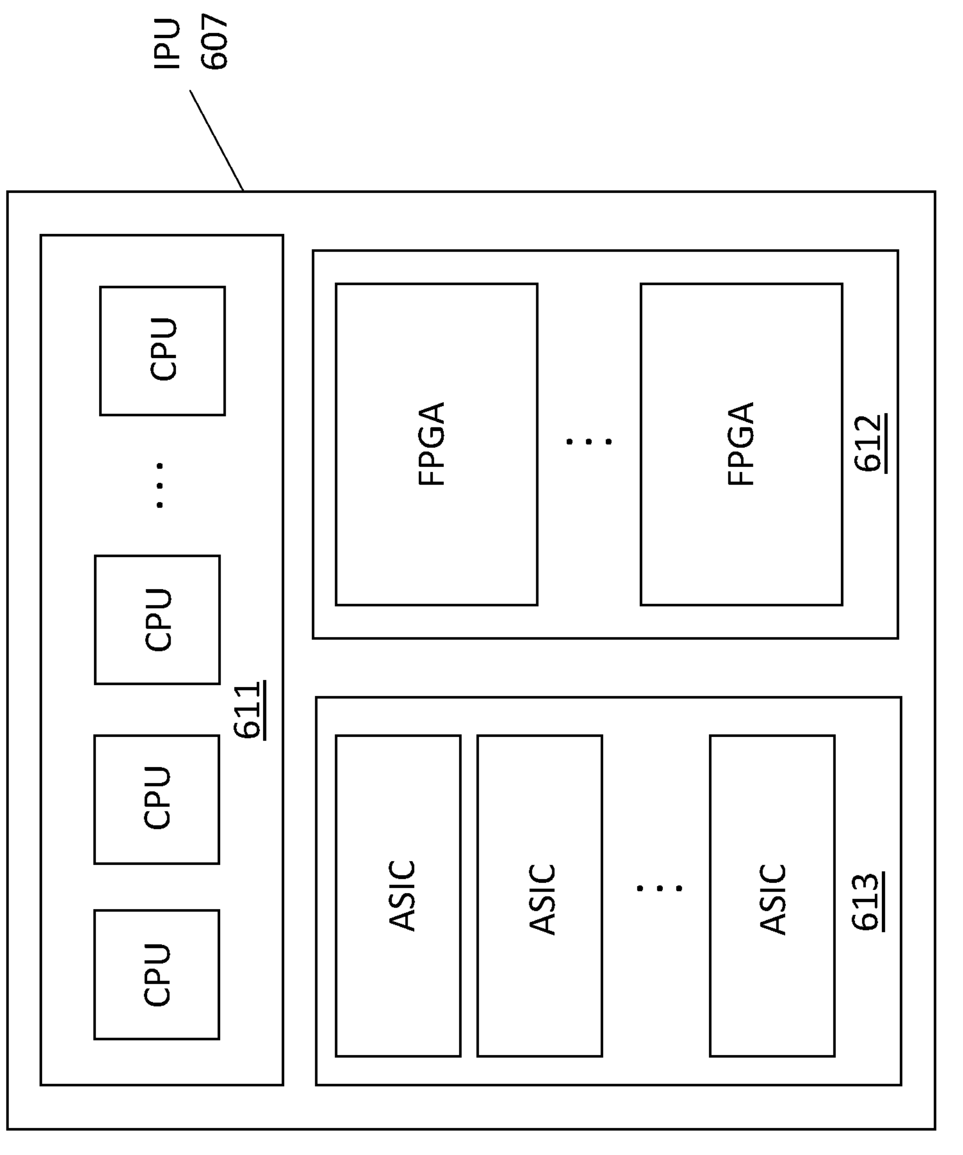
FIGS. 6*a* and 6*b* depict an IPU.

FIG. 6*a* shows an exemplary IPU 607. As observed in FIG. 6 the IPU 609 includes a plurality of general purpose processing cores 611, one or more field programmable gate arrays (FPGAs) 612, and/or, one or more acceleration hardware (ASIC) blocks 613. An IPU typically has at least one associated machine readable medium to store software that is to execute on the processing cores 611 and firmware to program the FPGAs (if present) so that the processing cores 611 and FPGAs 612 (if present) can perform their intended functions.

The processing cores 611, FPGAs 612 and ASIC blocks 613 represent different tradeoffs between versatility/programmability, computational performance and power consumption. Generally, a task can be performed faster in an ASIC block and with minimal power consumption, however, an ASIC block is a fixed function unit that can only perform the functions its electronic circuitry has been specifically designed to perform.

The general purpose processing cores 611, by contrast, will perform their tasks slower and with more power consumption but can be programmed to perform a wide variety of different functions (via the execution of software programs). Here, it is notable that although the processing cores can be general purpose CPUs like the data center's host CPUs 501, in many instances the IPU's general purpose processors 511 are reduced instruction set (RISC) processors rather than CISC processors (which the host CPUs 501 are typically implemented with). That is, the host CPUs 501 that execute the data center's application software programs 505 tend to be CISC based processors because of the extremely wide variety of different tasks that the data center's application software could be programmed to perform (with respect to FIG. 2, CPU units 201 are also typically general purpose CISC processors).

By contrast, the infrastructure functions performed by the IPUs tend to be a more limited set of functions that are better served with a RISC processor. As such, the IPU's RISC processors 611 should perform the infrastructure functions with less power consumption than CISC processors but without significant loss of performance.

The FPGA(s) 612 provide for more programming capability than an ASIC block but less programming capability than the general purpose cores 611, while, at the same time, providing for more processing performance capability than the general purpose cores 611 but less than processing performing capability than an ASIC block.

Figure 6B:
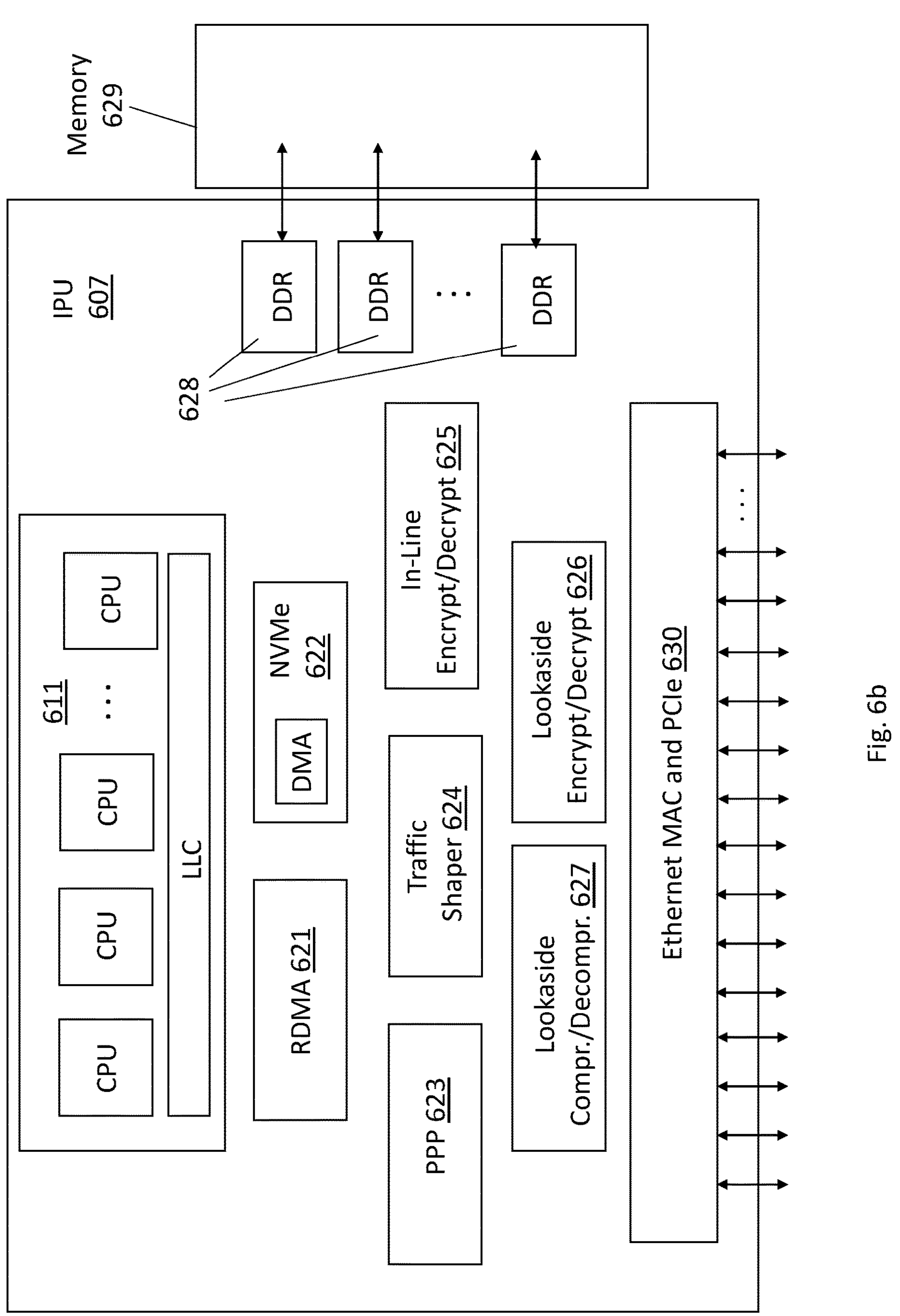

FIG. 6*b* shows a more specific embodiment of an IPU 607. The particular IPU 607 of FIG. 6*b* does not include any FPGA blocks. As observed in FIG. 6*b* the IPU 607 includes a plurality of general purpose cores (e.g., RISC) 611 and a last level caching layer for the general purpose cores 611. The IPU 607 also includes a number of hardware ASIC acceleration blocks including: 1) an RDMA acceleration ASIC block 621 that performs RDMA protocol operations in hardware; 2) an NVMe acceleration ASIC block 622 that performs NVMe protocol operations in hardware; 3) a packet processing pipeline ASIC block 623 that parses ingress packet header content, e.g., to assign flows to the ingress packets, perform network address translation, etc.; 4) a traffic shaper 624 to assign ingress packets to appropriate queues for subsequent processing by the IPU 509; 5) an in-line cryptographic ASIC block 625 that performs decryption on ingress packets and encryption on egress packets; 6) a lookaside cryptographic ASIC block 626 that performs encryption/decryption on blocks of data, e.g., as requested by a host CPU 501; 7) a lookaside compression ASIC block 627 that performs compression/decompression on blocks of data, e.g., as requested by a host CPU 501; 8) checksum/cyclic-redundancy-check (CRC) calculations (e.g., for NVMe/TCP data digests and/or NVMe DIF/DIX data integrity); 9) thread local storage (TLS) processes; etc.

Packet processing pipeline 623 can include functionality, at any one or more of the pipeline's constituent stages, to track, report and recover from network errors as described at length above with respect to FIGS. 2, 3*a*, 3*b*, 3*c* and 4. Conceivably, the IPU 607 can be viewed as a network component (e.g., at the edge of network 504).

The IPU 507 also includes multiple memory channel interfaces 628 to couple to external memory 629 that is used to store instructions for the general purpose cores 511 and input/output data for the IPU cores 511 and each of the ASIC blocks 621-626. The IPU includes multiple PCIe physical interfaces and an Ethernet Media Access Control block 630 to implement network connectivity to/from the IPU 609. As mentioned above, the IPU 607 can be a semiconductor chip, or, a plurality of semiconductor chips integrated on a module or card (e.g., a NIC).

Figure 7:
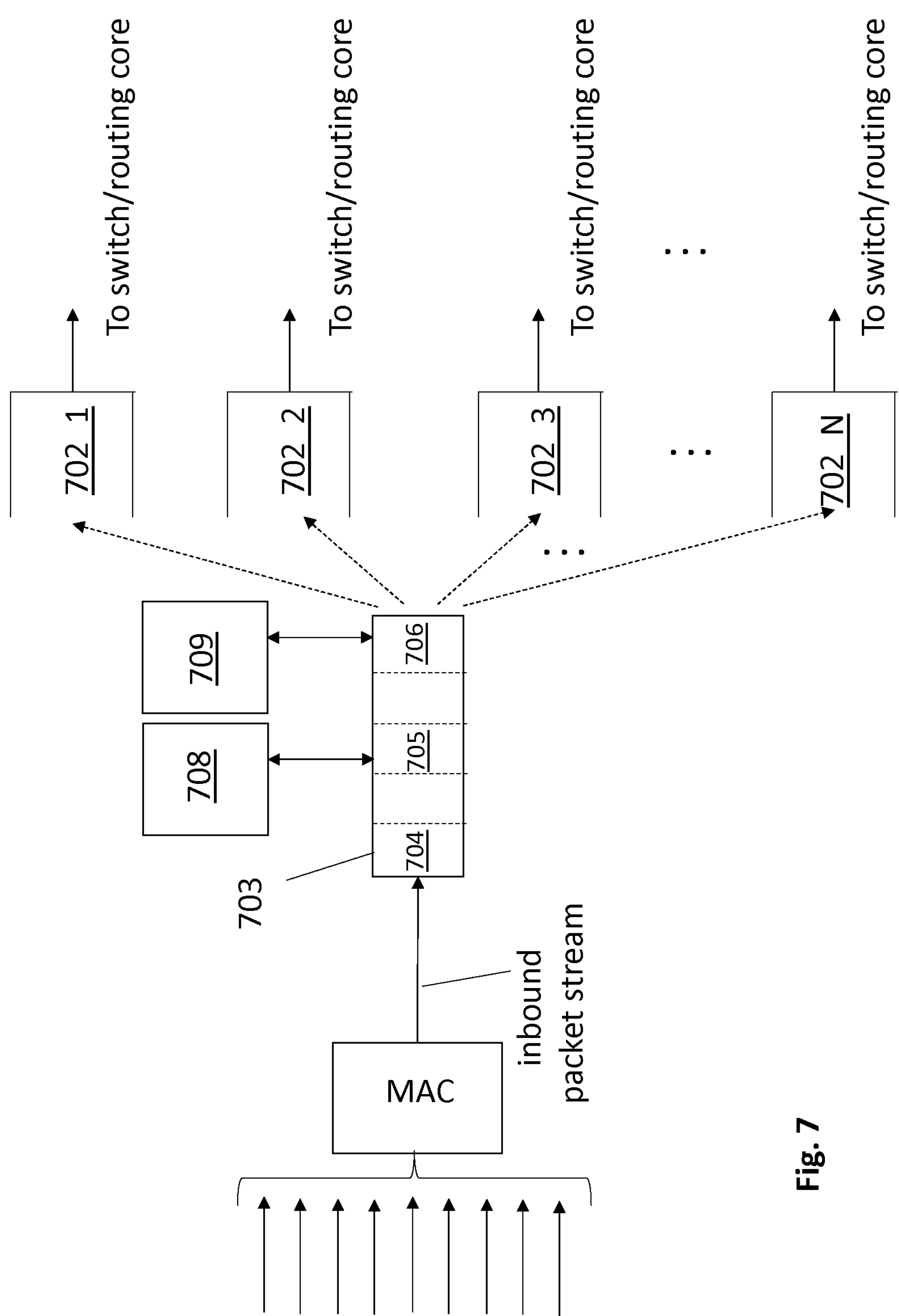
FIG. 7 depicts a packet processing pipeline.

FIG. 7 shows an embodiment of an ingress packet processing pipeline 703 that can include circuitry (e.g., circuitry 242 of FIG. 2), at any one or more of the pipeline's constituent stages, to track and report network errors and/or telemetry as described at length above with respect to FIGS. 2, 3*a*, 3*b*, 3*c* and 4. As observed in FIG. 7, the packet processing pipeline 703 is used to process inbound packets and assign each inbound packet to an appropriate queue. Generally, the pipeline 703 includes a stage 704 at (or toward) the pipeline's front end that parses a packet's header and extracts information found in the header's various fields.

The pipeline 703 also includes another stage 705 that identifies the flow that the inbound packet belongs to or otherwise "classifies" the packet for its downstream treatment or handling ("packet classification"). Here, the extracted packet header information (or portion(s) thereof) is compared against entries in a table 708 of looked for values. The particular entry whose value matches the packet's header information identifies the flow that the packet belongs to or otherwise classifies the packet.

The packet processing pipeline 703 also includes a stage 706 at (or toward) the pipeline's back end that, based on the content of the inbound packet's header information (typically the port and IP address information of the packet's source and destination), directs the packet to a particular one of the inbound queues 702_1 through 702_N.

Typically, packets having the same source and destination header information are part of a same flow and will be assigned to the same queue. With each queue being associated with a particular quality of service (e.g., queue service rate), switch core input port or other processing core, the forwarding of inbound packets having same source and destination information to a same queue effects a common treatment to packets' belonging to a same flow.

Egress pipelines can also be multi-staged and can be used to prepare a packet for emission (e.g., at a Layer 3 (IP) or higher level) such as creation of an outbound packet's IP header information.

Embodiments of the invention may include various processes as set forth above. The processes may be embodied in program code (e.g., machine-executable instructions). The program code, when processed, causes a general-purpose or special-purpose processor to perform the program code's processes. Alternatively, these processes may be performed by specific/custom hardware components that contain hard wired interconnected logic circuitry (e.g., application specific integrated circuit (ASIC) logic circuitry) or programmable logic circuitry (e.g., field programmable gate array (FPGA) logic circuitry, programmable logic device (PLD) logic circuitry) for performing the processes, or by any combination of program code and logic circuitry.

Elements of the present invention may also be provided as a machine-readable medium for storing the program code. The machine-readable medium can include, but is not limited to, floppy diskettes, optical disks, CD-ROMs, and magneto-optical disks, FLASH memory, ROMs, RAMs, EPROMs, EEPROMs, magnetic or optical cards or other type of media/machine-readable medium suitable for storing electronic instructions.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:

electronic circuitry to support multiple flows within a network, the electronic circuitry to determine respective telemetry information for the multiple flows and inject an alarm message into a particular one of the multiple flows upon an alarm condition being reached for the particular one flow, the alarm message comprising a multi-bit error code that describes the alarm condition, the multi-bit error code being one of multiple possible multi-bit error codes.

2. The apparatus of claim 1 wherein the electronic circuitry comprises a packet processing pipeline.

3. The apparatus of claim 2 wherein the packet processing pipeline is coupled between an ingress media access control circuitry and a switch core.

4. The apparatus of claim 1 wherein the electronic circuitry is to insert the alarm message into a header of a packet that belongs to the particular one flow.

5. The apparatus of claim 1 wherein the electronic circuitry is to create a packet to carry the alarm message and inject the packet into the particular one flow.

6. The apparatus of claim 1 wherein the electronic circuitry is to collect respective telemetry data for the multiple flows and respectively inject the respective telemetry data into the multiple flows.

7. The apparatus of claim 6 wherein the electronic circuitry is to accumulate the respective telemetry data for a particular other one of the multiple flows with earlier telemetry data that was earlier determined for the particular other one of the multiple flows and received at an ingress media access control interface.

8. The apparatus of claim 7 wherein the electronic circuitry is to inject the accumulated telemetry data into the particular other one of the multiple flows.

9. The apparatus of claim 6 wherein the respective telemetry data for a particular other one of the multiple flows comprises telemetry data for a link that transports packets of the particular other one of the multiple flows and multiple other ones of the multiple flows.

10. An apparatus comprising:

flow end-point processing circuitry to process a flow's packets at an end-point of the flow, the flow end-point processing circuitry to process a packet that belongs to the flow, the packet comprising an alarm message, the alarm message comprising a multi-bit error code that describes an alarm condition that was reached for the flow, the multi-bit error code being one of multiple possible multi-bit error codes, the flow end-point processing circuitry to raise a flag in response to the flow end-point processing circuitry's processing of the packet.

11. The apparatus of claim 10 wherein the flow end-point processing circuitry is flow destination end-point processing circuitry, the flow destination end-point processing circuitry to alert the flow's source end-point of the alarm message in response to the flag.

12. The apparatus of claim 10 wherein the flow end-point processing circuitry is flow destination end-point processing circuitry, the flow destination end-point processing circuitry to send a second alarm message to a network management function in response to the flag.

13. A data center, comprising:

a pool of CPUs;

a pool of memory resources;

a pool of accelerators;

a network communicatively coupling the pool of CPUs, the pool of memory resources and the pool of accelerators, the network comprising a network switch, the network switch comprising a), b), c) and d) below:

a) a switch core;

b) ingress media access control circuitry;

c) egress media access control circuitry, the network switch to support multiple flows that flow into the ingress media access control circuitry, through the switch core and from the egress media access control circuitry; and, d) electronic circuitry to support the multiple flows, the electronic circuitry to determine respective telemetry data for the multiple flows and inject an alarm message into a particular one of the multiple flows upon an alarm condition being reached for the particular one flow, the alarm message comprising a multi-bit error code that describes the alarm condition, the multi-bit error code being one of multiple possible multi-bit error codes.

14. The data center of claim 13 wherein the electronic circuitry comprises a packet processing pipeline coupled between the ingress media access control circuitry and the switch core.

15. The data center of claim 13 wherein the electronic circuitry is to insert the alarm message into a header of a packet that belongs to the particular one flow.

16. The data center of claim 13 wherein the electronic circuitry is to create a packet to carry the alarm message and inject the packet into the particular one flow.

17. The data center of claim 16 further comprising flow end-point processing circuitry to process the particular one flow's packets at an end-point of the particular one flow, the flow end-point processing circuitry to process a packet that belongs to the flow and includes the alarm message, the flow end-point processing circuitry to raise a flag in response to the flow end-point processing circuitry's processing of the packet.

18. The data center of claim 17 wherein the end-point is a source end-point.

19. The data center of claim 17 wherein the end-point is a destination end-point.

20. The data center of claim 17 wherein the circuitry comprises a packet processing pipeline.

* * * * *